(12) United States Patent
Soham

(10) Patent No.: US 7,477,965 B2
(45) Date of Patent: Jan. 13, 2009

(54) TWISTING WIRE ACTUATOR

(76) Inventor: Moshe Soham, Hoshaya, M.P. Hamovil, Hoshaya (IL) 17915

( * ) Notice: Subject to any disclaimer, the term of this patent is extended or adjusted under 35 U.S.C. 154(b) by 364 days.

(21) Appl. No.: 10/595,530

(22) PCT Filed: Oct. 24, 2004

(86) PCT No.: PCT/IL2004/000967
§ 371 (c)(1), (2), (4) Date: Apr. 26, 2006

(87) PCT Pub. No.: WO2005/041211
PCT Pub. Date: May 6, 2005

(65) Prior Publication Data
US 2008/0077258 A1 Mar. 27, 2008

Related U.S. Application Data

(60) Provisional application No. 60/513,998, filed on Oct. 27, 2003.

(51) Int. Cl.
G05D 1/02 (2006.01)
G05D 1/10 (2006.01)
G05B 19/18 (2006.01)
G05B 19/29 (2006.01)
B21F 7/00 (2006.01)
B21B 15/02 (2006.01)
B21D 11/14 (2006.01)
B21D 31/00 (2006.01)

(52) U.S. Cl. .......... 700/302; 700/56; 318/569; 318/600; 140/149; 72/65; 72/299; 72/371

(58) Field of Classification Search .......... 57/200, 57/204, 282, 296; 72/64, 65, 293, 295, 298, 72/299, 371; 140/30, 36, 39, 93.6, 118, 149; 318/560, 567, 569, 600; 700/56, 302
See application file for complete search history.

(56) References Cited

U.S. PATENT DOCUMENTS

| | | | | |
|---|---|---|---|---|
| 3,750,720 A | * | 8/1973 | Steigerwald | 140/149 |
| 3,763,426 A | * | 10/1973 | Wilkes | 324/515 |
| 3,957,092 A | * | 5/1976 | Loy et al. | 140/115 |
| 4,235,070 A | * | 11/1980 | Bravin | 57/71 |

(Continued)

OTHER PUBLICATIONS

"On The Design of Cable-Suspended Planar Parallel Robots", Abbas Fattah and Sunil K. Agrawal, Journal of Mechanical Design, 1021-1028, vol. 127, Sep. 2005, copyright 2005 by ASME(American Society of Mechanical Engineers) New York, NY.

(Continued)

*Primary Examiner*—Crystal Barnes Bullock

(57) ABSTRACT

A twisted wire actuator, whereby the shortening of the length of a wire or a bundle of wires, as it is twisted, is used to control the motion of an actuated element, achieving sub-micron motion resolution. The control can be performed robotically. The high resolution can be achieved without the use of gears, sliders, or high precision lead screws, thus enabling a simplified actuation system and eliminating sources of friction. The use of wires operating in opposing directions and having oppositely directed rotations significantly reduces the non-linearity effect inherent in twisted wire actuation, resulting in a system having a good level of motion linearity as a function of control input impulse. The use of multiple twisted wires attached to the actuated element at different angles, enables the implementation of robotic systems with multiple degrees of freedom. Several experimental actuators verify these results.

21 Claims, 4 Drawing Sheets

U.S. PATENT DOCUMENTS

| | | | | |
|---|---|---|---|---|
| 4,709,542 | A | * | 12/1987 | Krafft .............................. 57/16 |
| 5,826,629 | A | * | 10/1998 | West ........................... 140/119 |
| 6,318,062 | B1 | * | 11/2001 | Doherty ..................... 57/58.65 |

OTHER PUBLICATIONS

"CAT4 (Cable Actuated Truss-4 Degrees of Freedom): A Novel 4 DOF Cable Actuated Parallel Manipulator", Craig Kossowski and Leila Notash, Journal of Robotic Systems 19(12), 605-615 (2002), Copyright 2002 Wiley Periodicals, Inc.

"On Design of a Redundant Wire-Driven Parallel robot WARP manipulator", Kiyoshi Maeda, Satoshi Tadokoro, Toshi Takamori, Manfred Hiller, and Richard Verhoeven, Proceedings of the 1599 IEEE International Conference on Robotics & Automation, Detroit, Michigan May 1995.

"Development of a Large Parallel-Cable Manipulator for the Feed-Supporting System of a Next-Generation Large Radio Telescope", Y. X. Su, B. Y. Duan, R. D. Nan and B. Peng, Journal of Robotic Systems 18(11), 633-643 (2001) © 2001 by John Wiley & Sons, Inc.

"Development of an Ultrahigh Speed Robot FALCON using Wire Drive System", S. Kawamura, W. Choe, S. Tanaka, and S.R. Pandian, IEEE International Conference on Robotics and Automation 0-7803-1965-6/95 © 1995 IEEE.

"On the Inverse Kinematics, Statics, and Fault Tolerance of Cable-Suspended Robots", Rodney G. Roberts, Todd Graham and Thomas Lippitt, Journal of Robotic Systems 15(10), 581597 (1998) © 1998 by John Wiley & Sons, Inc.

"Kinematic Anlaysis of Planar Parallel Mechanisms Actuated with Cables", Cl'ement M. Gosselin Guillaume Barrette, Proceedings of the 2000 ASME Design and Engineering Technical Conference 391-399, © 2000, American Society of Mechanical Engineers.

"RoboCrane Project: An Advanced Concept for Large Scale Manufacturing", Roger Bostelman, James Albus, Nicholas Dagalakis, Adam Jacoff, Robotics and Manufacturing vol. 4 385-390, Asme Press Series, 1992.

"Concept Paper: Cable-Driven Robots for Use in Hazardous Environments", Andrew T. Riechel, Paul Bosscher, Harvey Lipkin, Imme Ebert-Uphoff, Georgia Institute of Technology, Atlanta, GA.

"Skycam" Wikipedia, the free encyclopedia, http://en.wikipedia.org/wiki/Skycam, downloaded Jul. 25, 2008.

"Translational Planar Cable-Direct-Driven Robots", Robert L. Williams II and Paolo Gallina, Journal of Intelligent and Robotics Systems 37: 69-96, 2003. © 2003 Kluwer Academic Publishers.

"Tension Distribution in Tendon Based Stewart Platforms", Richard Verhoeven and Manfred Hiller, Advances in Robot Kinematics 117-124, 2002 Kluwer Academic Publishing.

\* cited by examiner

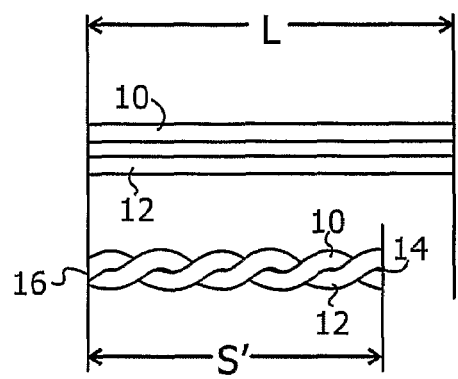
Fig. 1
Fig. 2
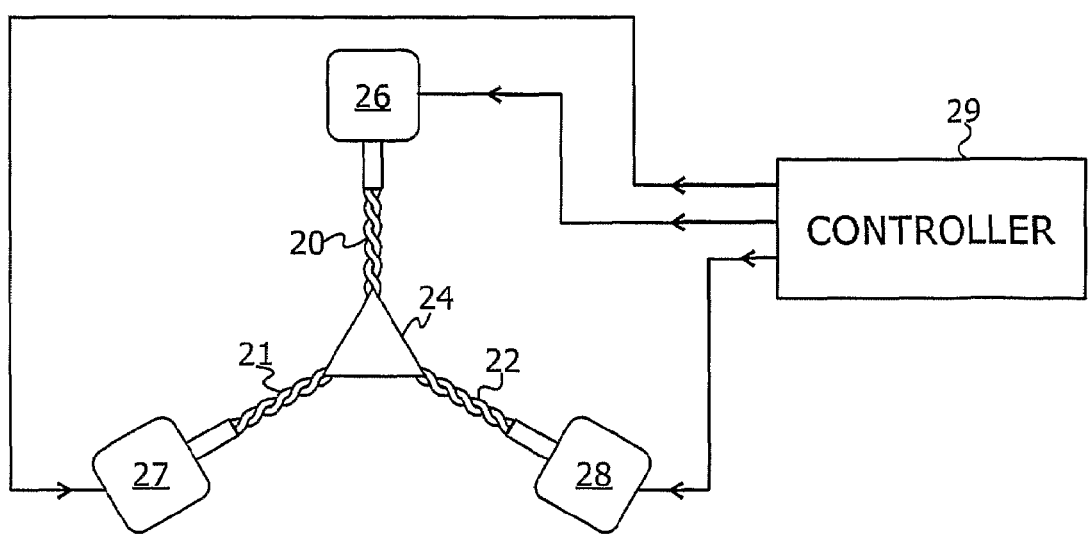

TWISTING WIRE ACTUATOR

FIELD OF THE INVENTION

The present invention relates to the field of mechanical actuation methods using twisted wires, especially for use in high precision positioning applications such as micro-robotics.

BACKGROUND OF THE INVENTION

Cable-driven robots using actuation cables which are generally pulled directly by means of motor-driven pulleys, are known in the prior art. Examples of such prior art actuators are described in the following published articles: "Development of an ultrahigh speed robot FALCON using wire drive system," by S. Kawamura et al., published in *IEEE International Conference on Robotics and Automation*, Vol. 1, pp. 215-220, 1995; "Kinematic analysis and design of planar parallel mechanisms actuated with cables," by G. Barrette et al., published in *ASME 26th Biennial Mechanisms and Robotics Conference*, Baltimore, USA, No. MECH-14091, 2000; "Workspace and design analysis of cable-suspended planar parallel robots," by A. Fattah et al., published in Proceedings of the *ASME Design Engineering Technical Conference*, Vol. 5B, pp. 1095-1103, 2002; Maeda, K., "On design of a redundant wire-driven parallel robot WARP manipulator," by K. Maeda et al., published in *IEEE International Conference on Robotics and Automation*, Vol. 2, pp. 895-900, 1999; "Development of a large parallel-cable manipulator for the feed-supporting system of a next-generation large radio telescope," by Y. X. Su et al., published in *Journal of Robotic Systems*, Vol. 18, No. 11, pp. 633-643, 2001; "Tension Distribution in Tendon-Based Stewart Platforms," by R. Verhoeven, et al., published in *Advances in Robot Kinematics*, edited by J. Lenarcic and F. Thomas, Kluwer Academic Publisher, Spain, 2002; "Translational Planar Cable-Direct-Driven Robot," by R. L. Williams et al., published in *Journal of Intelligent and Robotic Systems*, Vol. 37, pp. 69-96, 2003; and "Concept Paper: Cable Driven Robots for use in Hazardous Environments" by A. T. Reichel et al., published by the School of Mechanical Engineering of the Georgia Institute of Technology.

Actuator systems having up to six degrees of freedom using such pulley wound cables have been described in the following published articles: "On the Inverse Kinematics, Statics, and Fault Tolerance of Cable-Suspended Robots" by R. G. Roberts, et al., published in *Journal of Robotic Systems*, Vol. 15, No. 10, pp. 581-597, 1998; "A Robotic Crane System utilizing the Stewart Platform Configuration" by R. Bostelman, et al., published in *International Symposium on Robotics and Manufacturing*, Santa Fe, N.Mex., 1992; and "CAT4 (cable actuated truss-4 degrees of freedom): A novel 4 DOF cable actuated parallel manipulator," by C. Kossowski, et al., published in *Journal of Robotic Systems*, Vol. 19, No. 12, pp. 605-615, 2002.

Such wire driven robotic actuators are available commercially from companies such as provide SKYCAM surveillance systems, and are characterized by the low inertia and the resulting high acceleration and speed of the robot. Since the main advantages of this structure are its high speed, low inertia and large workspace, the issue of accuracy, which is generally low, has rarely been seriously addressed in prior art cable-driven robot structures. Moreover, the actual pose (position and orientation) of the output in prior art cable-driven robots depends on the wire connecting points at the actuating base, and these points inherently move as the wire is rolled onto the driven pulley or reel, whether the wire builds up layer on top of layer, or whether it moves sideways as it lays down on the pulley side by side. Compensation for this motion of the actuating point is essential if high positional accuracy is required. Mechanical devices used to overcome this problem, such as idler pulleys, guide holes or guide grooves, which define a fixed point of motion origin, add to system friction, inertia and stick-slip effects, thereby further degrading the system accuracy and other characteristics.

There therefore exists a need for a low inertia, high speed cable-type of actuator, which overcomes at least some of the disadvantages of the prior art cable driven actuators.

The disclosures of all publications mentioned in this section and in the other sections of the specification, are hereby incorporated by reference, each in their entirety.

SUMMARY OF THE INVENTION

The present invention seeks to provide a new linear actuator based on the application of a rotational twist to a wire or bundle of wires, such that its length changes as it is twisted, and this length change is used as the source of motion for the actuator system. The actuator is thus of simple construction and has no need for sliders, gears, lead screws, belts, pulleys or other devices to support and actuate the payload. The system has some points of similarity to prior art cable or wire driven systems, but unlike such systems, where the wire is pulled, typically by winding onto a reel or pulley which is rotated by a motor, in the system of the present invention the wire or wire bundle is rotationally twisted by the motor. Using this technique, the displacement range remains comparatively small, but the forces applied by the actuator are considerable and the system resolution is significantly better than prior art pulled wire systems. Throughout this application, and as claimed, the term wire is understood to mean either a single wire or a bundle of wires, and if a bundle, it can contain two or more strands.

By modeling the twist-to-displacement function, and by using properly selected wires, actuators constructed according to various preferred embodiments of the present invention, can be utilized in miniature positioning devices with an accuracy within the sub-micron range.

By increasing the number of separate wires connected to a movable positioned device or payload, an accurate, wire-driven robot with motion having up to six degrees of freedom can be constructed. In general, for n degrees of freedom, (n+1) wires are required. A controller is preferably used to ensure that each wire is given the twist angle necessary to move the payload or positioned device to the desired position, or along a desired trajectory. In this application, the payload or device positioned by the twisted wire actuator is often generically referred to as a platform, but it is to be understood that the invention is not meant to be limited to a platform-shaped actuated device, but to any element or device whose motion is actuated by the system.

The input/output function of a single twisted wire actuator, namely, the actuated end displacement as a function of wire twist angle, is non-linear. This complicates the control system required to implement a single twisted wire actuator in a robotic application, since the preferred mode of operating any control system is to use a linear response to control signal. However, the use of two wires, each pulling on one of the two opposite sides of a moving platform in order to maintain wire tension at all times, and each having initial twists of equal magnitude but of oppositely directed angular rotation, considerably reduces this non-linear effect to a level where non-linearity can be disregarded over quite a large range, and the actuator can be treated as practically linear. However, even if linearity is not assumed, it is possible to obtain a specific desired displacement, by actuating different twist angles on each side of the platform.

An additional advantage of the twisted wire actuator over prior art pulled wire actuators is that since the twisted wire system maintains a precise wire connecting point at the base, none of the above-mentioned compensation devices sometimes used in the prior art actuators are required.

There is thus provided in accordance with a preferred embodiment of the present invention, a controlled motion actuator system, comprising:

(a) a movable element, (b) at least a first wire whose length changes with twist applied thereto, the at least first wire having one end attached to the movable element, (c) a first rotary motion shaft attached to a second end of the at least first wire, such that rotation of the shaft generates a twist in the at least first wire, thereby changing its length and adjusting the position of the moveable element, and (d) a controller for providing input control signals to rotate the first rotary motion shaft such that the position of the movable element is determined in accordance with the controller.

There is further provided in accordance with yet another preferred embodiment of the present invention, a controlled motion actuator system as described above and also comprising:

(e) a second wire having one end thereof attached to the movable element in a sector generally opposite to that where the at least first wire is attached, and (f) a second rotary motion shaft attached to a second end of the at least second wire such that rotation of the second shaft generates a twist in the second wire, thereby changing the length of the second wire, wherein the position of the movable element is determined by the cooperative action of the twists applied to the at least first wire and to the second wire.

In the latter case, the controller preferably provides input control signals to rotate the first rotary motion shaft and the second rotary motion shaft, such that the twists applied to the at least first wire and the second wire are in opposite directions. The rotations generated by the controller may preferably be of equal magnitude and opposite sign. In such a case, the rotations are preferably operative to increase the linearity of motion of the movable element as a function of the controller inputs, compared to the linearity of the change in length of a single twisted wire as a function of applied twist angle of rotation.

In accordance with still another preferred embodiment of the present invention, the first above-described controlled motion actuator systems may also preferably comprise at least two additional wires, each having one end thereof attached to the movable element in different sectors to that in which the at least first wire is attached, and whose lengths are preferably adjusted by twists applied thereto, such that the position of the movable element is determined by the cooperative action of twists applied to the at least first wire and to the at least two additional wires. If so, then the at least two additional wires are preferably two additional wires such that the position of the movable element is determined in two dimensions.

Alternatively and preferably, the first above-described controlled motion actuator system may also preferably comprise a spring having one end thereof attached to the movable element in a sector generally opposite to that where the at least first wire is attached, and wherein the position of the movable element is determined by a twist applied to the at least first wire.

Additionally and preferably, the first above-described controlled motion actuator system may also preferably comprise:

(g) a second wire, whose length changes with twist applied thereto, and having one end thereof attached to the movable element in a sector generally opposite to that where the at least first wire is attached, and (h) a spring having one end thereof attached to the movable element in a sector generally opposite to those where the at least first wire and the second wire are attached, such that the position of the movable element is determined by the cooperative action of twists applied to the at least first and to the second wires operating against the action of the spring.

In any of the above-described controlled motion actuator systems, the position of the movable element is preferably reached by a predetermined motion path of the moveable element, and the motion path is preferably predetermined by the controller.

In accordance with further preferred embodiments of the present invention, any of the above-mentioned rotary motion shafts may be driven by an electric motor, which could preferably be a stepping motor.

There is also provided in accordance with yet a further preferred embodiment of the present invention, a method of providing controlled motion to a moveable element, comprising the steps of:

(a) providing a movable element whose position is to be controlled, (b) attaching to the movable element one end of at least a first wire whose length changes with twist applied thereto, (c) attaching a first rotary motion shaft to a second end of the at least a first wire, the rotation of the shaft being controlled by input signals from a controller, and (d) applying a controlled twist to the first rotary motion shaft at the second end of the at least first wire, such that the position of the moveable element is adjusted in accordance with the controller.

There is further provided in accordance with yet another preferred embodiment of the present invention, a method of providing controlled motion to a moveable element as described above and also comprising the steps of:

(e) attaching to the movable element a second wire whose length changes with twist applied thereto, the second wire having one end thereof attached to the movable element in a sector generally opposite to that where the at least first wire is attached, (f) attaching a second rotary motion shaft to a second end of the second wire, the rotation of the shaft being controlled by a controller, and (g) applying a controlled twist to the second rotary motion shaft at the second end of the second wire, such that the position of the movable element is determined by the cooperative action of twists applied through the rotary motion shafts to the at least first wire and to the second wire.

In the latter case, the twist applied to the at least first wire and the twist applied to the second wire are preferably in opposite directions, and the controller preferably generates rotations of opposite sign through the rotary motion shafts to the at least first wire and the second wire to control the position of the moveable element. Furthermore, the rotations generated by the controller are preferably of equal magnitude and opposite sign. In such a case, the rotations are preferably operative to increase the linearity of motion of the movable element as a function of the controller inputs, compared to the linearity of the change in length of a single twisted wire as a function of applied twist angle of rotation.

There is further provided in accordance with yet another preferred embodiment of the present invention, a method of providing controlled motion to a moveable element, as described above using a second wire, and also comprising the steps of:

(h) attaching to the movable element in at least one sector generally opposite to those where the at least first wire and the second wire are attached, a first end of at least one additional wire whose length changes with twist applied thereto, and (i) applying a twist to a second end of the at least one additional wire, wherein the twists applied to the at least first wire, to the second wire, and to the at least one additional wire are adjusted to position the movable element in at least two dimensions. Additionally and preferably, the magnitude and direction of the twists are made so as to increase the linearity of motion of the movable element as a function of the controller inputs, compared to the linearity of the change in length of any of the at least first, the second and the at least one additional wire as a function of twist angle of rotation applied to any of them.

BRIEF DESCRIPTION OF THE DRAWINGS

The present invention will be understood and appreciated more fully from the following detailed description, taken in conjunction with the drawings in which:

FIG. 1 is a schematic drawing showing how a wire made of a number of strands shortens in length as it is twisted;

FIG. 2 is a schematic illustration of a two degrees-of-freedom system, using three twisted wires attached to a platform whose motion it is desired to control;

DETAILED DESCRIPTION OF PREFERRED EMBODIMENTS

Figure 3:
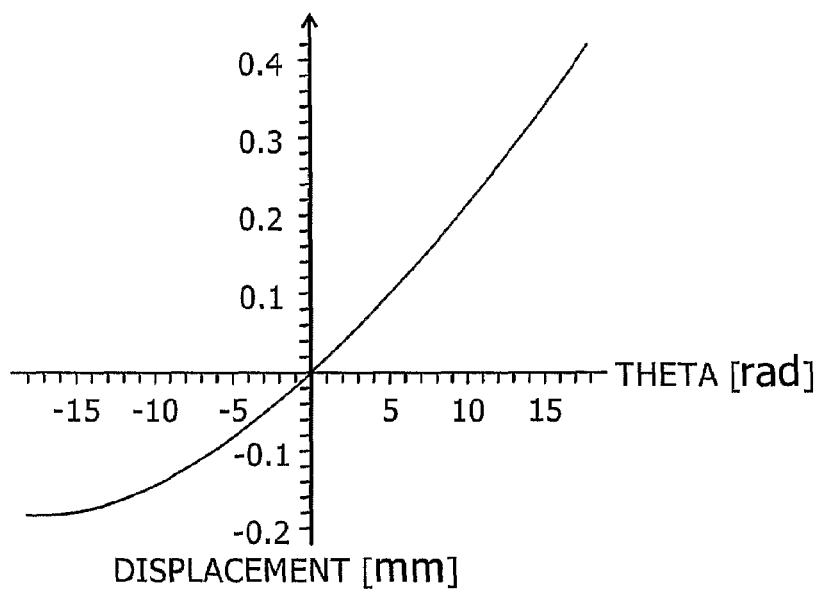
FIG. 3 is a graph showing the non-linear relation between the twist angle and the free end displacement of a twisted wire with an initial twist of $6\pi$.

Reference is now made to FIG. 1, which illustrates schematically how a wire made of any number of strands 10, 12, shortens in length as it is twisted. The actual shortening length is now calculated for a wire with two strands, as shown in FIG. 1, where the unshortened length is marked L, and the shortened length for a specific twist angle, is marked s'. The calculation method shown below is, however, also applicable for different numbers of strands. A calculation, different from that shown below, can also be made for the shortening of a single wire as it is twisted.

Assuming that one strand, the first strand of the two, is straight and fixed, and that the other strand rotates one complete revolution about the first one, such that the rotation angle $\theta=2\pi$. Unwrapping the wire reveals that the first strand length, has been effectively shortened when in its twisted form, and its length, when measured along a straight line, is given by the expression:

$$s'=\sqrt{L^2-(2\pi D)^2} \qquad (1)$$

where:
s'—strand effective shortened length
L—strand initial length
D—strand diameter Now, if the first strand is not fixed straight, but can also twist around the second twisted strand, such that both strands twist around each other symmetrically, then by symmetry, following one complete revolution of the combined strands, the length of the composite twisted wire is given by:

$$s_1=\sqrt{L^2-(\pi D)^2} \qquad (2)$$

where $s_1$ is the shortened length after one revolution, $\theta=2\pi$.

For any rotation angle $\theta$, the shortened wire length s, becomes:

$$s=\tfrac{1}{2}\sqrt{4L^2-(\theta D)^2} \qquad (3)$$

Equation (3) can be used to calculate the wire length for any given twist angle. Thus, if an actuated element is attached to the free end 14 of the twisted wire, and the other end 16 is fixed spatially at the twisting mechanism, equation (3) provides a means of calculating the displacement (L−s) of the movement of the actuated element as a function of the twist applied to the wire. When typical values are inserted into equation (3), it is shown that it is possible, when using a typical 0.2 mm diameter wire and a standard stepping motor with 200 pulses per revolution, to controllably provide very small displacements, in the sub-micron range. The single twisted wire actuator, whose characteristics are calculated above, could be part of a more complex twisted wire actuator system having more than one twisted wire, or it could be a single wire system, in which the actuated element is attached by a spring, for instance, to a fixed point, such that the twisted wire is always kept in tension.

In order to actuate such a system in more than one direction, which is generally what is required of a practical robotic manipulator, more than one wire is required. Reference is now made to FIG. 2, which is a schematic illustration of such a practical actuator system, constructed and operative according to a further preferred embodiment of the present invention, and having two degrees of freedom (DOF). The system of FIG. 2 preferably uses three twisted wires 20, 21, 22, attached in different angular sectors to a platform 24, whose motion is controlled by control of the twists applied to each of the three twisted wires. Although the wires are shown in FIG. 2 attached to the platform at mutual angles of approximately 120°, it is to be understood that this is only a preferable embodiment which provides maximum control sensitivity in both orthogonal directions. Other preferred angles of attachment may also be used, if advantageous, so long as the combination of the angles of attachment is such that all the wires are maintained under tension at all times within the control range of the application, and that the angular sectors for attachment are chosen such as to provide adequate motion control in the desired directions. In this sense, the term sector, when referred to in this application in connection with the attachment point of the wires to the actuated platform, and as claimed, is understood to mean angular sectors which provide the above mentioned positive tension and adequate controlled motion of the platform.

The twisting of the wires is preferably achieved by means of motors 26, 27, 28, preferably stepping motors, whose rotation is controlled by means of an external controller 29. The position of the platform 24 is determined by the combination of twists applied to the three twisted wires by the controller 29. Alternatively and preferably, one of the wires may be replaced by a spring, connected at its distant end to a fixed point, to maintain tension on the other two wires, and the two-dimensional directions of motion of the platform are then obtained by suitable control of the twist of only two twisted wire actuators.

However, there exists a problem in the use of the motion provided by each single twisted wire actuator, as described above in FIG. 1 and as derived in equation (3), since this motion exhibits a non-linear relation between the rotation angle input, $\theta$ and the output displacement, (L−s). This would manifest itself in a practical twisted wire actuator system by a lack of linearity in the motion of the actuated end as a function of the control input signal.

Reference is now made to FIG. 3, which illustrates this effect by plotting the relationship between twist angle input $\theta$ to the wire, and the resulting free end displacement for a preferred example of a single 0.25 mm. diameter multi-strand wire, 13 mm. in length, and for an initial twisting angle, $\theta_i$, of +6π, i.e. about +19 radians.

The slope of the curve shows a point of inflection at a rotation of −6π, where the twist is completely released, as is seen in the graph of FIG. 3. It is observed that as the twist angle increases, there is an increase in the rate of shortening, i.e. in the displacement per unit of rotation, and this illustrates the non-linearity of such a single twisted wire actuator. One method for overcoming this non-linearity is to determine the actual ratio of displacement per unit of rotation at given rotations, based on the current twist angle, and to correct the non-linearity of the ratio according to the actual twist angle at which the actuator is operating. Such corrections can preferably be stored in a look-up table. Alternatively, for a required displacement, the actual position-dependent twist angle can be derived algorithmically from equation (3). However, such corrections complicate the control system of any robotic system using such a twisted wire actuator, and it would be desirable to avoid the use of such corrections.

According to another preferred embodiment of the present invention, a method of enabling a more linear operating system can be provided when implementing a multi-directional twisted wire actuator. In order to demonstrate both the nature of the problem and a preferred solution, it is convenient to consider the simplest case of a one-degree-of-freedom (DOF) system, requiring two opposing wires. Such a system is shown in the experimental actuating system shown in FIG. 6 below. Assuming that equal but opposite twist angles $\theta$ are applied to each wire, one for wrapping the wire on one side of the platform, and the other for un-wrapping the wire on the opposing side, then due to the inherent non-linearity of a twisted wire system, different length changes occur on the opposite sides. At any point other than at the middle of the range, where equal but oppositely directed twists result in equal but oppositely directed displacements, the wire shortening due to a positive input twist +$\theta$, applied on one side, is always greater than the wire lengthening due to an identical negative input twist −$\theta$, having the same magnitude but oppositely directed, applied on the other side. This means that the overall free length of both wires together always decreases compared to the overall free length at the middle point. Since the two wires are connected to a fixed position base at both ends, the overall wire tension is increased as motion proceeds either side of the middle point.

This seemingly unwanted effect in fact contributes to a solution of the actuator non-linearity problem. Since the tension of each wire changes while being twisted, and assuming that the system flexibility is the same on both sides, (which might not be accurately true, since each side of the platform has a wire with a different twist angle, and this may affect the wire elasticity), then the actual displacement at the output end is due not only to the geometric shortening but also to the wire/structure elasticity.

Assuming for simplicity that both sides of the platform in fact have the same elasticity, then the actual platform displacement M is the mean between the shortening of the wire on one side of the platform and lengthening on the other:

$$M = \tfrac{1}{4}(\sqrt{4L^2 - (D\theta_i - D\theta)^2} - \sqrt{4L^2 - (D\theta_i + D\theta)^2}) \tag{4}$$

where $\theta_i$ is the initial twist angle.

Figure 4:
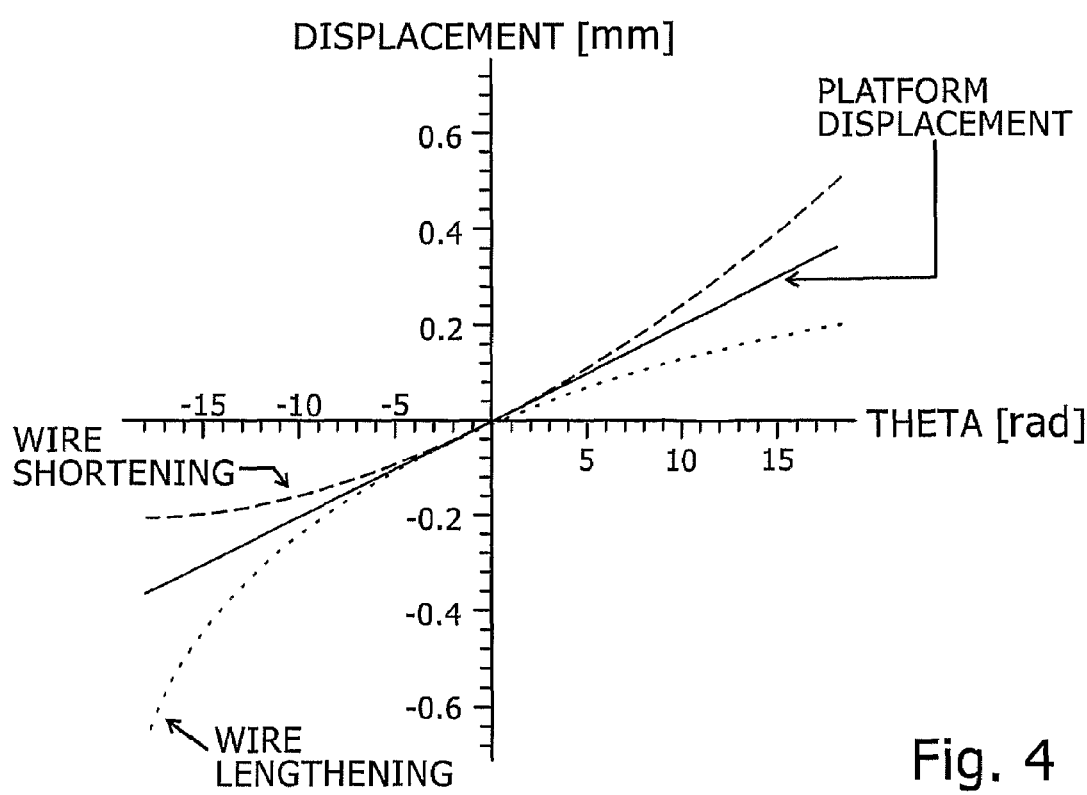
FIG. 4 is a graph showing, for a two opposing twisted wire actuator, the wire length displacements of the two opposing wires, and the resulting total platform displacement, as a function of the twist angle.

Reference is now made to FIG. 4, which is a graph showing, for the above-mentioned twisted wire actuator having two opposing wires, the wire length displacements as a function of the applied input twist angle $\theta$ of each of the two opposing wires on either side of the actuated platform, one curve for the wire with the initial positive twist, showing the wire shortening with increasing twist, and the other with the initial negative twist, showing the wire lengthening with increasing twist. The curves are plotted assuming the same elasticity on both sides. In addition, the resulting total platform displacement is plotted as a function of twist angle $\theta$ of either wire, assuming that both wires are given equal and opposite changes in twist angle. The curves are plotted for the preferred example of wires having the parameters D=0.25 mm, L=13 mm, and $\theta_i$=+6π. It is observed that there is a cancellation effect between the displacement generated by the two wires, and the platform displacement curve is almost a straight line, which means that for such a twisted opposed wire actuator, the non-linearity effect is almost completely cancelled out. The region of near linearity on either side of the middle point of operation depends on the chosen combination of length and wire diameter, but for most combinations of practical use, the region of near linearity is substantial.

This result becomes even more apparent when the slopes of the displacement as a function of the twist angle are calculated. Taking the power series of the derivative of the displacement M about $\theta$=0, the derivative M' can be expressed by the series:

$$M' = \frac{D^2 \theta_i}{2\sqrt{f}} + \frac{3L^2 D^4 \theta_i}{f^2 \sqrt{f}} \theta^2 + o(\theta^4) \tag{5}$$

where $f = 4l^2 - D^2 \theta_i^2$.

For $\theta$=0 and its surrounding region, where only even powers of $\theta$ are present, since the second order term in $\theta$ is small, the displacement slope can be approximated by the first term on the right-hand side of equation (5):

$$M'_{\theta=0} = \frac{D^2}{2\sqrt{4L^2/\theta_i^2 - D^2}} \quad (6)$$

Since D<<L, this can be approximated by:

$$M'_{\theta=0} \sim \frac{D^2 \theta_i}{4L} \quad (7)$$

Thus, it is seen that M' is independent of θ, and that the displacement is thus essentially linear with twist angle.

Figure 5:
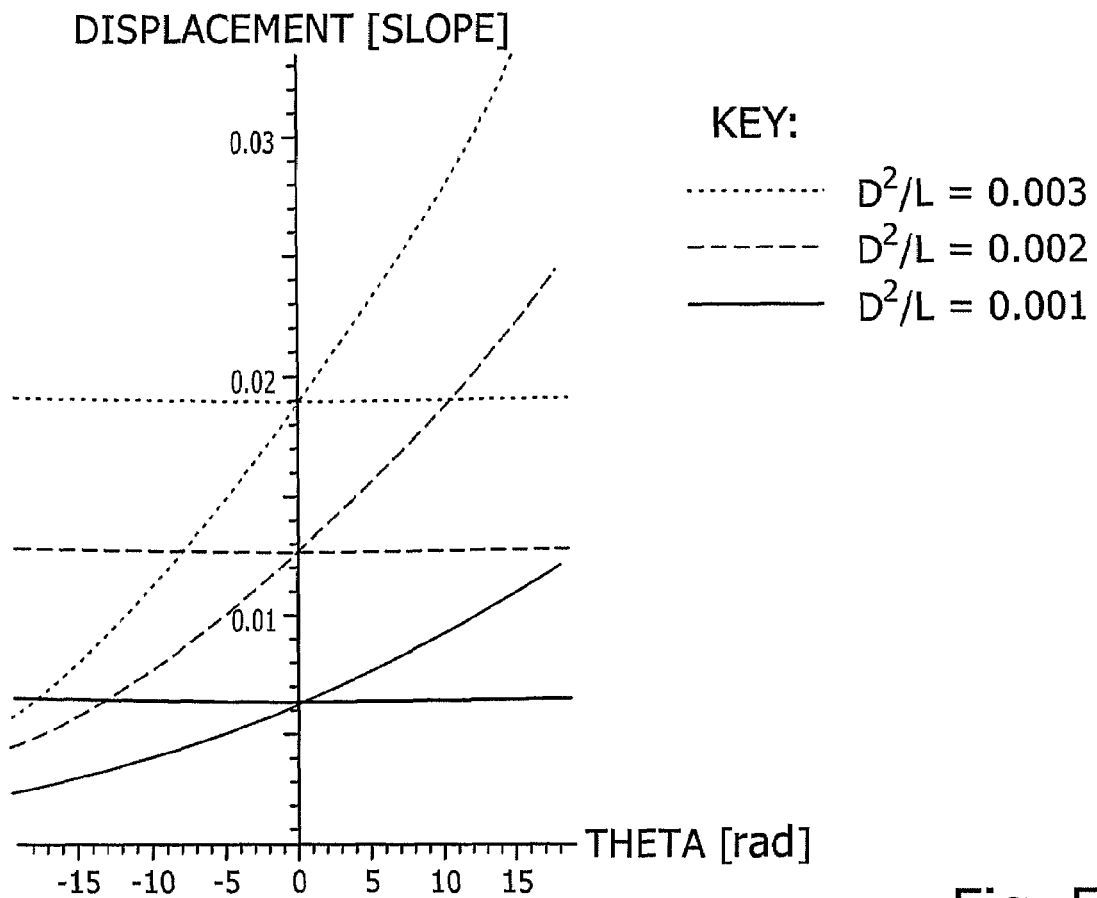
FIG. 5 is a graph showing, for a one-DOF, two opposing wire actuator undergoing twist angles of the same magnitude but opposite directions, (i) the displacement slope as a function of twist angle for single wires of different dimensions, and (ii) the platform displacement slope as a function of twist angle.

Reference is now made to FIG. 5, which is a schematic graph showing:
  (i) the displacement slope as a function of twist angle for single wires of different dimensions, these being the sloped curves on the graph, and
  (ii) the platform displacement slope as a function of twist angle, for a one-DOF, two opposing wire actuator undergoing twist angles of the same magnitude but opposite directions, these being the almost flat curves.

Both of these displacement slope curves are plotted for three different values of $D^2/L$, 0.001, 0.002 and 0.003. As can be seen from FIG. 5, in spite of the significant displacement slope of the single wires, the slopes of opposing wire actuators constructed using these single wires is very small over the whole range plotted, indicating good linearity.

The actually observed displacement non-linearity in the opposing wire actuator is much smaller. For commonly used wire diameters and lengths, this displacement non-linearity is generally of an order of less than one percent. This is an acceptable value for the majority of linear actuator applications. It should be added that compensation of even this small non-linearity is always possible by calculating the residual effect and actuating different twisting angles at each side of the moving platform.

A practical positioning device is characterized by parameters such as accuracy, repeatability, resolution, velocity, acceleration, force, payload, size, inertia, natural frequency, etc. The appropriate type of wire needed for the twisting wire actuator of the present invention is determined by the desired operating parameters of the actuator. In order to achieve resolutions in the micron range, the wire diameter should be of the order of a few tenths of a millimeter. To ensure high repeatability, the wire should have minimal creep and hysteresis. To ensure accuracy, the system must be calibrated. As mentioned above, by using the same but opposite twisting angle on both sides of the moving platform, linearity of up to one percent can be obtained without any further applied corrections. The use of oppositely directed twist angles also prevents unnecessary torque from being applied to the platform, thus simplifying maintenance of the planar orientation shown in FIG. 6 below. If a higher accuracy is required, the calibration process should preferably include an algorithm for defining the input twist angles of the wires for each different platform pose. The use of such an algorithm is also preferable for an actuator with more than one DOF, though it is possible that a basic, first order cancellation of non-linear effects can be achieved in twisted wire systems having more than one DOF, without the need for such algorithmic correction.

It is to be understood that although the above-described use of equal but opposite twists is particularly advantageous for improving the linearity of the system, it is also possible to construct, according to further preferred embodiments of the present invention, opposing wire actuator systems using unequal but opposite twists, and even using twists having the same direction of rotation.

High tensional strength is needed to withstand the tension forces generated, since the wires are put under considerable tension to increase both the system stiffness or rigidity, and the natural frequency. System stiffness depends on wire elasticity and the level of internal forces. These factors are described, for instance, in the publications "A parallel x-y Manipulator with Actuation Redundancy for High-Speed and Active-Stiffness Applications." By S. Kock, et al., published in *IEEE International Conference on Robotics and Automation*, Vol. 2, pp. 2295-2300, 1998; "Stiffness Synthesis of a Variable Geometry Six Degrees-Of-Freedom Double Planar Parallel Robot," by N. Simaan, et al., published in *The International Journal of Robotics Research*, in press; and "Open-Loop Stiffness Control of Overconstrained Mechanisms/Robotic Linkage Systems," by B. Yi, et al., published in *IEEE International Conference on Robotics and Automation*, pp. 1340-1345, 1989.

Multiple strand wire is preferable to single strand wire because of its lower torsional rigidity and the smaller possible radii of curvature through which it can be twisted or bent.

A combination of the above-mentioned system requirements determines the wire type and material. With judicious selection of the wire parameters, a miniature motion system having a dynamic range of 4 orders of magnitude, or even better, can be readily constructed using the various embodiments of the present invention. Such a system could thus have a range of several millimeters with better than one micron resolution.

Figure 6:
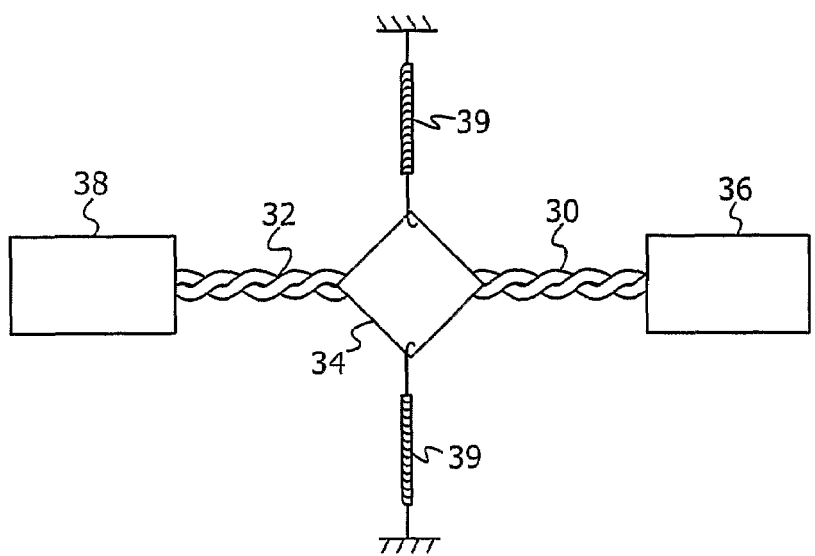
FIG. 6 is a schematic illustration of an experimental one-DOF system comprising two opposing wires, each connected at one end to a moving platform and at the other end to actuating motors.

Reference is now made to FIG. 6 which is a schematic illustration of an experimental one-DOF system comprising two opposing wires preferably made up of multiple strands, and each connected at one end to a moving platform 34 and at the other end to the actuating motors 36, 38. The wires must be securely connected to the motors shafts and to the moving platform so that wire slip cannot occur. The rotation of the motors causes the wire shortening/lengthening. Low-cost stepping motors may preferably be used, such as type TEAC No. 14769070-90, supplied by Shinano Kenshi Inc., of Culver City, Calif., U.S.A. No torque limits were observed for the experimental range of motion tested. When using stepping motors, dividing the displacement in millimeters by the number of motor pulses yields the system resolution in mm/pulse. Motion of the motors is preferably controlled by a controller, similar to that shown in the 2-DOF embodiment of FIG. 3. In the system whose schematic illustration is shown in FIG. 6, the length of the platform between wire connections is 11.5 mm, and platform weight is 0.29 gr. The platform is also connected to two springs 39 for stabilizing it against rolling and undesired lateral or out of plane movement. Such springs are needed only in the case of one-DOF motion. In a system having more DOF's, such as the preferred embodiment shown in FIG. 3, the function of the springs is taken over by the additional twisted wire actuator set, which not only provides the second DOF, but also stabilizes the system against rolling. In the experimental system of FIG. 6, use is made of Vectran 750/150 HS wire, 0.25 mm in diameter, as supplied by the Hoechst Celanese Company of Charlotte, N.C., U.S.A. According to the manufacturer's specifications, no creep should be observed in a Vectran rope following 1000 hours of testing at a load of 50% of breaking strength.

Figure 7:
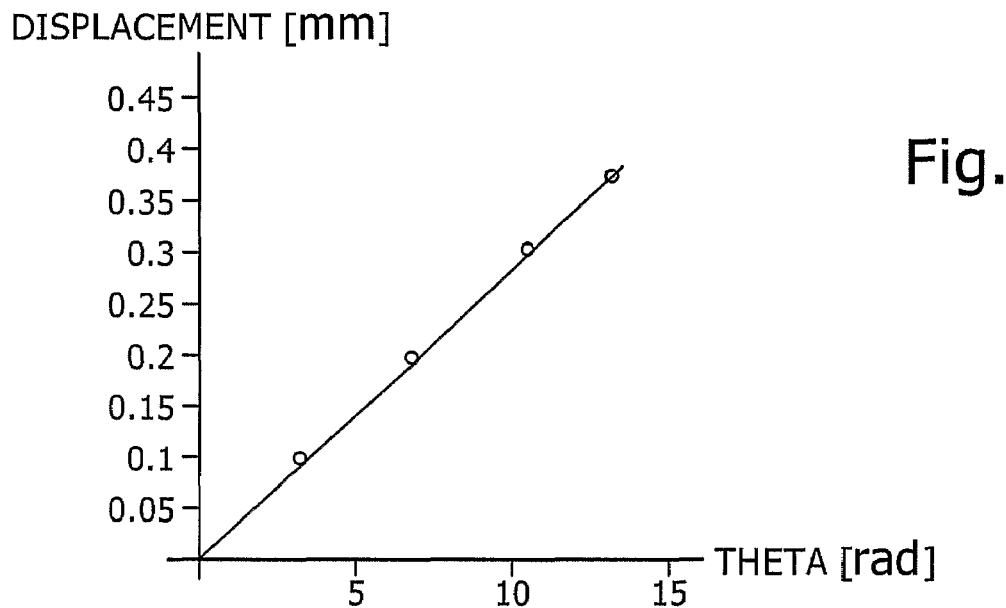
FIG. 7 is a graph showing the displacement in millimeters of a moving platform actuated by two opposing twisting wires, such as that shown in the preferred system of FIG. 6, as a function of the twisting angle $\theta$.

Reference is now made to FIG. 7, which is a graph showing the displacement in millimeters as a function of the twisting angle θ, of an exemplary moving platform actuated by two opposing twisting wires, such as that shown in the preferred system of FIG. 6. The displacement measurements were obtained using a microscope. A 10 mm wire length, 0.25 mm wire diameter and an initial twisting angle of 3 complete revolutions (approximately 6π) were used. Stepper motors having 400 pulses/revolution were used, yielding an approximate displacement sensitivity of 0.5 microns per step. In practice, the motion per step is not fixed because of the slight non-linearity explained above, though theoretically it ranges from 0.476 to 0.48 microns. The experimental results are indicated in the graph of FIG. 7 by the circular marks, and the theoretically expected result by the solid curve. FIG. 7 shows that the experimental and theoretical results are highly correlated.

Figure 8:
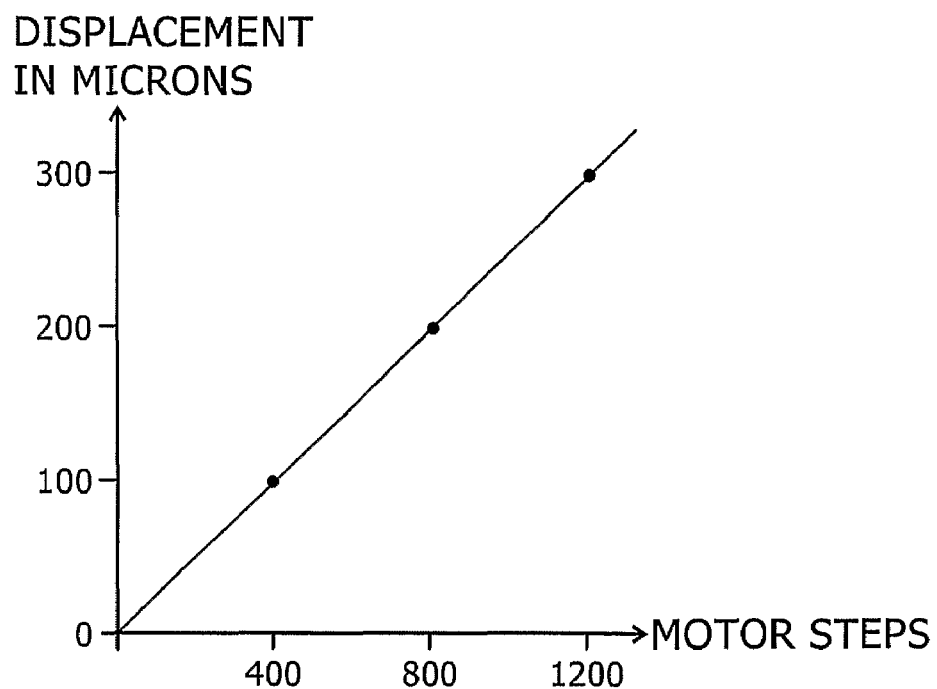
FIG. 8 is a graph showing the platform displacement as a function of the number of motor steps, for a system such as that shown in FIG. 6.

Reference is now made to FIG. 8, which is a graph showing the platform displacement in microns as a function of the number of motor steps, for a system such as that shown in FIG. 6. The high sensitivity of the actuating system is clear from the graph of FIG. 8. Furthermore, measurements show that the system with the parameters used in FIG. 6 displays high repeatability and low hysteresis.

In designing an accurate twisted wire actuating system, such as those of the above-described preferred embodiments of the present invention, a number of additional problems must be considered. Firstly, motor axis run-out, generally due to limited manufacturing tolerances, is translated into inaccuracies in the moving platform position in direct proportion to the wire length. Hence, in order to achieve high system accuracy, motors with a good shaft run-out specification should preferably be used. Alternatively and preferably, a device that maintains low eccentricity may be used, but at the cost of added friction. Secondly, as already mentioned, it is important to connect the wires tightly to the motor shafts, so that they do not inadvertently slip and change their lengths.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

I claim:

1. A controlled motion actuator system, comprising:
    a movable element;
    at least a first wire whose effective length changes with twist applied thereto, said at least first wire having one end attached to said movable element;
    a first rotary motion shaft attached to a second end of said at least first wire, such that rotation of said shaft generates a twist in said at least first wire, thereby changing its effective length and adjusting the position of said moveable element; and
    a controller for providing input control signals to rotate said first rotary motion shaft such that said position of said movable element is determined in accordance with said controller.

2. A controlled motion actuator system according to claim 1 and further comprising:
    a second wire having one end thereof attached to said movable element in a sector generally opposite to the sector in which said at least first wire is attached; and
    a second rotary motion shaft attached to a second end of said second wire such that rotation of said second shaft generates a twist in said second wire, thereby changing the effective length of said second wire,
    wherein the position of said movable element is determined by the cooperative action of said twists applied to said at least first wire and to said second wire.

3. A controlled motion actuator system according to claim 2 and wherein said twists applied to said at least first wire and said second wire are in opposite directions.

4. A controlled motion actuator system according to claim 3 and wherein said twists of opposite direction are of equal magnitude.

5. A controlled motion actuator system according to claim 4 and wherein said twists are operative to increase the linearity of motion of said movable element as a function of controller inputs, compared to the linearity of the change in effective length of either of said at least first and said second twisted wires as a function of applied twist angle of rotation.

6. A controlled motion actuator system according to claim 2 and wherein a least one of said rotary motion shafts is driven by an electric motor.

7. A controlled motion actuator system according to claim 6 wherein said electric motor is a stepping motor.

8. A controlled motion actuator system according to claim 1 and further comprising at least two additional wires, each having one end thereof attached to said movable element in sectors different to that in which said at least first wire is attached, and whose effective lengths are adjusted by twists applied thereto, and wherein the position of said movable element is determined by the cooperative action of twists applied to said at least first wire and to said at least two additional wires.

9. A controlled motion actuator system according to claim 8 and wherein said at least two additional wires are such that the position of said movable element is determined in two dimensions.

10. A controlled motion actuator system according to claim 1 and further comprising a spring having one end thereof attached to said movable element in a sector generally opposite to the sector in which said at least first wire is attached, and wherein the position of said movable element is determined by the cooperative action of forces applied thereto by said spring and a twist applied to said at least first wire.

11. A controlled motion actuator system according to claim 1 and further comprising:
    a second wire whose effective length changes with twist applied thereto, and having one end thereof attached to said movable element in a second sector different from the sector in which said at least first wire is attached; and
    a spring having one end thereof attached to said movable element in a third sector generally opposite to those sectors where said at least first wire and said second wire are attached,
    wherein the position of said movable element is determined by the cooperative action of twists applied to said at least first and to said second wires operating against the action of said spring.

12. A controlled motion actuator system according to claim 1 and wherein said position of said movable element is reached by a predetermined motion path of said moveable element, and wherein said motion path is predetermined by said controller.

13. A controlled motion actuator system according to claim 1 and wherein said first rotary motion shaft is driven by an electric motor.

14. A controlled motion actuator system according to claim 13 wherein said electric motor is a stepping motor.

15. A method of providing controlled motion to a moveable element, comprising the steps of:

provding a movable element whose position is to be controlled;

attaching to said movable element one end of at least a first wire whose effective length changes with twist applied thereto;

attaching at least a first rotary motion shaft to a second end of said at least a first wire, the rotation of said shaft being controlled by input signals from a controller; and applying a controlled twist to said first rotary motion shaft at said second end of said at least first wire, such that the position of said moveable element is adjusted in accordance with said controller.

16. The method of claim 15 and further comprising the steps of:

attaching to said movable element a second wire whose effective length changes with twist applied thereto, said second wire having one end thereof attached to said movable element in a sector generally opposite to the sector in which said at least first wire is attached;

attaching a second rotary motion shaft to a second end of said second wire, the rotation of said shaft being controlled by a controller; and applying a controlled twist to said second rotary motion shaft at said second end of said second wire, such that the position of said movable element is determined by the cooperative action of twists applied though said rotary motion shafts to said at least first wire and to said second wire.

17. The method of claim 16 and wherein said twist applied to said at least first wire and said twist applied to said second wire are in opposite directions.

18. The method of claim 17 and wherein said twists of opposite direction are of equal magnitude.

19. The method of claim 18 and wherein said twists are operative to increase the linearity of motion of said movable element as a function of controller inputs, compared to the linearity of the change in effective length of either of said at least first and said second twisted wires as a function of applied twist angle of rotation.

20. The method of claim 16 and further comprising the steps of:

attaching to said movable element in at least one sector generally opposed to those sectors where said at least first wire and said second wire are attached, a first end of at least one additional wire whose effective length changes with twist applied thereto; and applying a twist to a second end of said at least one additional wire, wherein said twists applied to said at least first wire, to said second wire, and to said at least one additional wire are adjusted to position said movable element in at least two dimensions.

21. The method of claim 20 and wherein the magnitude and direction of said twists are such as to increase the linearity of motion of said movable element as a function of said controller inputs, compared to the linearity of the change in effective length of any of said at least first, said second and said at least one additional wire as a function of twist angle of rotation applied to any of them.

* * * * *